(12) United States Patent
Shiba

(10) Patent No.: US 10,495,742 B2
(45) Date of Patent: Dec. 3, 2019

(54) TARGET DETECTION DEVICE

(71) Applicant: NEC Corporation, Minato-ku, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 15/313,677

(22) PCT Filed: Jun. 1, 2015

(86) PCT No.: PCT/JP2015/002745
§ 371 (c)(1),
(2) Date: Nov. 23, 2016

(87) PCT Pub. No.: WO2015/190058
PCT Pub. Date: Dec. 17, 2015

(65) Prior Publication Data
US 2017/0184712 A1    Jun. 29, 2017

(30) Foreign Application Priority Data
Jun. 9, 2014   (JP) ................................ 2014-118541

(51) Int. Cl.
*G01S 7/526*    (2006.01)
*G01S 7/524*    (2006.01)
*G01S 15/88*    (2006.01)

(52) U.S. Cl.
CPC .............. *G01S 7/526* (2013.01); *G01S 7/524* (2013.01); *G01S 15/88* (2013.01)

(58) Field of Classification Search
CPC ........... G01S 7/526; G01S 7/524; G01S 15/88
See application file for complete search history.

(56) References Cited

U.S. PATENT DOCUMENTS

| 4,187,488 A | 2/1980 | Anderson et al. |
| 4,717,862 A * | 1/1988 | Anderson .............. H05B 39/09 |
| | | 315/241 S |

(Continued)

FOREIGN PATENT DOCUMENTS

| JP | H01-305385 A | 12/1989 |
| JP | H03-115882 A | 5/1991 |

(Continued)

OTHER PUBLICATIONS

Schock, Buried Object Scanning Sonar, vol. 26, No. 4 (Year: 2001).*

(Continued)

*Primary Examiner* — Isam A Alsomiri
*Assistant Examiner* — Amie M Ndure

(57) ABSTRACT

The present invention enables control of the specifications of a transmission unit and reception unit in a manner so as to reduce the effect of scattered waves reaching the reception unit as a result of scattering caused by the medium through which wave propagates. This target detection device has a transmission unit, a reception unit, a detection unit, and a control unit. The control unit controls the specifications of the transmission unit and reception unit in a manner so as to satisfy a relational equation for reducing the effect of scattered waves reaching the reception unit due to scattering caused by the medium through which wave propagates. The transmission unit transmits wave, and the reception unit receives the reflection wave of the wave reflected by a detection subject. The detection unit detects the detection subject on the basis of the output of the reception unit.

11 Claims, 21 Drawing Sheets

(56) References Cited

U.S. PATENT DOCUMENTS

| | | | |
|---|---|---|---|
| 4,961,174 A | 10/1990 | Teel et al. | |
| 5,243,541 A | 9/1993 | Ulich | |
| 7,852,709 B1 | 12/2010 | Lerro et al. | |
| 9,106,286 B2* | 8/2015 | Agee | H04B 7/0413 |
| 9,197,297 B2* | 11/2015 | Agee | H04B 7/0413 |
| 2014/0079248 A1 | 3/2014 | Short et al. | |

FOREIGN PATENT DOCUMENTS

| | | |
|---|---|---|
| JP | H03-140888 A | 6/1991 |
| JP | H04-052584 A | 2/1992 |
| JP | H04-315079 A | 11/1992 |
| JP | H08-62323 A | 3/1996 |
| JP | H09-269367 A | 10/1997 |
| JP | H10-282221 A | 10/1998 |
| JP | 2000-310557 A | 11/2000 |
| JP | 2001-174545 A | 6/2001 |
| JP | 2002-082161 A | 3/2002 |
| JP | 3367462 B2 | 1/2003 |
| JP | 2007-507691 A | 3/2007 |

OTHER PUBLICATIONS

Japanese Office Action for JP Application No. 2016-527624 dated Sep. 19, 2017 with English Translation.

Steven G. Schock et al., "Buried Object Scanning Sonar", IEEE Journal of Oceanic Engineering, vol. 26, No. 4, pp. 677-680, Oct. 1, 2001.

Extended European Search Report for EP Application No. EP15806369.3 dated Jan. 18, 2018.

International Search Report for PCT Application No. PCT/JP2015/002745, dated Aug. 25, 2015.

English translation of Written opinion for PCT Application No. PCT/JP2015/002745.

* cited by examiner $$SL + S_v + 10\log\frac{\pi\sqrt{\pi}\,a^2 b}{d} \leq AL \quad \cdots \text{EQUATION 1}$$

Fig. 8

$$B_1(x,y,z) = \exp\left(-\frac{x^2}{2\sigma_x^2} - \frac{y^2}{2\sigma_y^2}\right) \quad \cdots \text{EQUATION 2}$$

$$B_1(x,y,z) = \exp\left(-\frac{x^2}{2a^2z^2} - \frac{y^2}{2b^2z^2}\right) \quad \cdots \text{EQUATION 3}$$

$$B_2(x,y,z) = \exp\left\{-\frac{(x-d)^2}{2a^2z^2} - \frac{y^2}{2b^2z^2}\right\} \quad \cdots \text{EQUATION 4}$$

$$\frac{I_0 B_2(x,y,z) s_v dxdydz}{\{(x-d)^2+y^2+z^2\}(x^2+y^2+z^2)} \quad \cdots \text{EQUATION 5}$$

$$\frac{I_0 B_1(x,y,z) B_2(x,y,z) s_v dxdydz}{\{(x-d)^2+y^2+z^2\}(x^2+y^2+z^2)} \quad \cdots \text{EQUATION 6}$$

$$R = \iiint_{\substack{-\infty \le x \le +\infty \\ -\infty \le y \le +\infty \\ 0 \le z \le +\infty}} \frac{I_0 B_1(x,y,z) B_2(x,y,z) s_v dxdydz}{\{(x-d)^2+y^2+z^2\}(x^2+y^2+z^2)}$$

$$= \iiint_{\substack{-\infty \le x \le +\infty \\ -\infty \le y \le +\infty \\ 0 \le z \le +\infty}} \frac{I_0 s_v \exp\left\{-\frac{x^2+(x-d)^2}{2a^2z^2} - \frac{y^2}{b^2z^2}\right\}}{\{(x-d)^2+y^2+z^2\}(x^2+y^2+z^2)} dxdydz \quad \cdots \text{EQUATION 7}$$

$$R' = \iiint_{\substack{-\infty \le x \le +\infty \\ -\infty \le y \le +\infty \\ 0 \le z \le +\infty}} \frac{I_0 s_v \exp\left\{-\frac{x^2+(x-d)^2}{2a^2z^2} - \frac{y^2}{b^2z^2}\right\}}{z^4} dxdydz \quad \cdots \text{EQUATION 8}$$

Fig. 9

$$\int_{-\infty}^{\infty} \exp\left\{-\frac{x^2+(x-d)^2}{2a^2z^2}\right\}dx = \sqrt{\pi}\,az\exp\left(-\frac{d^2}{4a^2z^2}\right)$$
$$\cdots \text{EQUATION 9}$$

$$\int_{-\infty}^{\infty} \exp\left\{-\frac{y^2}{b^2z^2}\right\}dy = \sqrt{\pi}\,bz \quad \cdots \text{EQUATION 10}$$

$$R' = \iiint_{\substack{-\infty \leq x \leq +\infty \\ -\infty \leq y \leq +\infty \\ 0 \leq z \leq +\infty}} \frac{I_0 s_v \exp\left\{-\frac{x^2+(x-d)^2}{2a^2z^2} - \frac{y^2}{b^2z^2}\right\}}{z^4} dxdydz$$

$$= \int_0^\infty \frac{I_0 s_v}{z^4}\sqrt{\pi}\,az\exp\left(-\frac{d^2}{4a^2z^2}\right)\sqrt{\pi}\,bz\,dz$$

$$= \int_0^\infty \frac{I_0 s_v \pi ab}{z^2}\exp\left(-\frac{d^2}{4a^2z^2}\right)dz \quad \cdots \text{EQUATION 11}$$

$$\int_0^\infty \frac{1}{z^2}\exp\left(-\frac{d^2}{4a^2z^2}\right)dz = \int_{-\infty}^0 t^2\exp\left(-\frac{d^2t^2}{4a^2}\right)\left(-\frac{1}{t^2}\right)dt$$

$$= \int_0^\infty \exp\left(-\frac{d^2t^2}{4a^2}\right)dt = \frac{\sqrt{\pi}\,a}{d} \quad \cdots \text{EQUATION 12}$$

$$R' = \int_0^\infty \frac{I_0 s_v \pi ab}{z^2}\exp\left(-\frac{d^2}{4a^2z^2}\right)dz = I_0 s_v \pi ab \cdot \frac{\sqrt{\pi}\,a}{d}$$

$$= \frac{I_0 s_v \pi\sqrt{\pi}\,a^2 b}{d} \quad \cdots \text{EQUATION 13}$$

$$RL' = 10\log R' = 10\log I_0 + 10\log s_v + 10\log\frac{\pi\sqrt{\pi}\,a^2 b}{d}$$

$$= SL + S_v + 10\log\frac{\pi\sqrt{\pi}\,a^2 b}{d} \quad \cdots \text{EQUATION 14}$$

Fig. 17

$$\frac{d}{s_v \pi \sqrt{\pi} a^2 b} \geq \alpha \quad \cdots \text{EQUATION 15}$$

$$\frac{E}{R'} \propto \frac{d}{s_v \pi \sqrt{\pi} a^2 b} \quad \cdots \text{EQUATION 16}$$

Fig. 18

$$SL + S_v + 10\log \frac{\pi \sqrt{2\pi} fgh}{d} \leq AL \quad \cdots \text{EQUATION 17}$$

Fig. 20

$$B_3(r, \theta, z) = \exp\left\{-\frac{(z-d)^2}{2f^2 r^2}\right\} \quad \cdots \text{EQUATION 18}$$

$$B_4(r, \theta, z) = \exp\left\{-\frac{z^2}{2g^2 r^2} - \frac{\theta^2}{2h^2}\right\} \quad \cdots \text{EQUATION 19}$$

$$\frac{I_0 B_3(r, \theta, z) s_v r dr d\theta dz}{\{r^2 + (z-d)^2\}(r^2 + z^2)} \quad \cdots \text{EQUATION 20}$$

$$\frac{I_0 B_3(r, \theta, z) B_4(r, \theta, z) s_v r dr d\theta dz}{\{r^2 + (z-d)^2\}(r^2 + z^2)} \quad \cdots \text{EQUATION 21}$$

$$R = \iiint_{\substack{0 \le r \le +\infty \\ 0 \le \theta \le 2\pi \\ -\infty \le z \le +\infty}} \frac{I_0 B_3(r, \theta, z) B_4(r, \theta, z) s_v r dr d\theta dz}{\{r^2 + (z-d)^2\}(r^2 + z^2)}$$

$$= \iiint_{\substack{0 \le r \le +\infty \\ 0 \le \theta \le 2\pi \\ -\infty \le z \le +\infty}} \frac{I_0 \exp\left\{-\frac{(z-d)^2}{2f^2 r^2}\right\} \exp\left\{-\frac{z^2}{2g^2 r^2} - \frac{\theta^2}{2h^2}\right\} s_v r dr d\theta dz}{\{r^2 + (z-d)^2\}(r^2 + z^2)}$$

$$= \iiint_{\substack{0 \le r \le +\infty \\ 0 \le \theta \le 2\pi \\ -\infty \le z \le +\infty}} \frac{I_0 \exp\left\{-\frac{(z-d)^2}{2f^2 r^2} - \frac{z^2}{2g^2 r^2}\right\} \exp\left\{-\frac{\theta^2}{2h^2}\right\} s_v r dr d\theta dz}{\{r^2 + (z-d)^2\}(r^2 + z^2)} \quad \cdots \text{EQUATION 22}$$

Fig. 21

$$R = \iiint_{\substack{0 \leq r \leq +\infty \\ 0 \leq \theta \leq 2\pi \\ -\infty \leq z \leq +\infty}} \frac{I_0 \exp\left\{-\frac{(z-d)^2}{2f^2 r^2} - \frac{z^2}{2g^2 r^2}\right\} \exp\left(-\frac{\theta^2}{2h^2}\right) s_v \, r \, dr \, d\theta \, dz}{\{r^2+(z-d)^2\}\{r^2+z^2\}}$$

$$\approx R' = \iiint_{\substack{0 \leq r \leq +\infty \\ 0 \leq \theta \leq 2\pi \\ -\infty \leq z \leq +\infty}} \frac{I_0 \exp\left\{-\frac{(z-d)^2}{2f^2 r^2} - \frac{z^2}{2g^2 r^2}\right\} \exp\left(-\frac{\theta^2}{2h^2}\right) s_v \, r \, dr \, d\theta \, dz}{r^4}$$

$$= \iiint_{\substack{0 \leq r \leq +\infty \\ 0 \leq \theta \leq 2\pi \\ -\infty \leq z \leq +\infty}} \frac{I_0 \exp\left\{-\frac{(z-d)^2}{2f^2 r^2} - \frac{z^2}{2g^2 r^2}\right\} \exp\left(-\frac{\theta^2}{2h^2}\right) s_v \, dr \, d\theta \, dz}{r^3}$$

··· EQUATION 23

$$\int_{-\infty}^{+\infty} \exp\left\{-\frac{(z-d)^2}{2f^2 r^2} - \frac{z^2}{2g^2 r^2}\right\} dz = \frac{\sqrt{2\pi} \cdot fgr \cdot \exp\left\{-\frac{d^2}{2(f^2+g^2)r^2}\right\}}{\sqrt{f^2+g^2}}$$

··· EQUATION 24

$$\int_0^{2\pi} \exp\left(-\frac{\theta^2}{2h^2}\right) d\theta \approx \int_{-\infty}^{+\infty} \exp\left(-\frac{\theta^2}{2h^2}\right) d\theta = \sqrt{2\pi} \cdot h$$

··· EQUATION 25

$$R' = \iiint_{\substack{0 \leq r \leq +\infty \\ 0 \leq \theta \leq 2\pi \\ -\infty \leq z \leq +\infty}} \frac{I_0 \exp\left\{-\frac{(z-d)^2}{2f^2 r^2} - \frac{z^2}{2g^2 r^2}\right\} \exp\left(-\frac{\theta^2}{2h^2}\right) s_v \, dr \, d\theta \, dz}{r^3}$$

$$\approx R'' = \iiint_{\substack{0 \leq r \leq +\infty \\ -\infty \leq \theta \leq 2\pi \\ -\infty \leq z \leq +\infty}} \frac{I_0 \exp\left\{-\frac{(z-d)^2}{2f^2 r^2} - \frac{z^2}{2g^2 r^2}\right\} \exp\left(-\frac{\theta^2}{2h^2}\right) s_v \, dr \, d\theta \, dz}{r^3}$$

$$= \int_0^{+\infty} \frac{\sqrt{2\pi} \cdot fgr \cdot \exp\left\{-\frac{d^2}{2(f^2+g^2)r^2}\right\}}{\sqrt{f^2+g^2}} \cdot \frac{\sqrt{2\pi} \cdot h \cdot I_0 s_v \, dr}{r^3}$$

··· EQUATION 26

Fig. 22

$$R'' = \int_0^{+\infty} \frac{\sqrt{2\pi} \cdot \text{fgr} \cdot \exp\left\{-\frac{d^2}{2(f^2+g^2)r^2}\right\}}{\sqrt{f^2+g^2}} \frac{\sqrt{2\pi} \cdot h \cdot I_0 s_v dr}{r^3}$$

$$= \int_0^{+\infty} \frac{\sqrt{2\pi} \cdot \text{fg} \cdot \exp\left\{-\frac{d^2}{2(f^2+g^2)r^2}\right\}}{\sqrt{f^2+g^2}} \frac{\sqrt{2\pi} \cdot h \cdot I_0 s_v dr}{r^2}$$

···EQUATION 27

$$\int_0^{+\infty} \frac{\exp\left\{-\frac{d^2}{2(f^2+g^2)r^2}\right\} dr}{r^2} = -\int_{+\infty}^0 \exp\left\{-\frac{d^2 t^2}{2(f^2+g^2)}\right\} dt = \int_0^{+\infty} \exp\left\{-\frac{d^2 t^2}{2(f^2+g^2)}\right\} dt$$

$$= \frac{\sqrt{2\pi(f^2+g^2)}}{2d}$$

···EQUATION 28

$$R'' = \int_0^{+\infty} \frac{\sqrt{2\pi} \cdot \text{fg} \cdot \exp\left\{-\frac{d^2}{2(f^2+g^2)r^2}\right\}}{\sqrt{f^2+g^2}} \frac{\sqrt{2\pi} \cdot h \cdot I_0 s_v dr}{r^2}$$

$$= \frac{2\pi \text{fgh} I_0 s_v}{\sqrt{f^2+g^2}} \cdot \frac{\sqrt{2\pi(f^2+g^2)}}{2d} = \frac{\pi\sqrt{2\pi} \text{fgh} I_0 s_v}{d}$$

···EQUATION 29

$$RL'' = 10\log R'' = 10\log I_0 + 10\log s_v + 10\log \frac{\pi\sqrt{2\pi} \text{fgh}}{d}$$

$$= SL + S_v + 10\log \frac{\pi\sqrt{2\pi} \text{fgh}}{d}$$

···EQUATION 30

Fig. 23

$$\frac{d}{\pi \sqrt{2\pi f g h s_v}} \geq \alpha \qquad \cdots \text{EQUATION 31}$$

$$\frac{E}{R''} \propto \frac{d}{\pi \sqrt{2\pi f g h s_v}} \qquad \cdots \text{EQUATION 32}$$

TARGET DETECTION DEVICE

This application is a National Stage Entry of PCT/JP2015/002745 filed on Jun. 01, 2015, which claims priority from Japanese Patent Application 2014-118541 filed on Jun. 09, 2014, the contents of all of which are incorporated herein by reference, in their entirety.

TECHNICAL FIELD

The present invention relates to a target detection device, a target detection method, and a program.

BACKGROUND ART

A variety of devices, including sonar devices, radar devices, and lidar devices, that detect targets by transmitting waves such as sound waves, radio waves, and light waves, and receiving reflected waves from the target have been proposed or put to practical use. For these types of target detection devices, a variety of methods for reducing the effects caused by interfering signals (e.g., reverberation) have also been proposed or put to practical use.

For example, according to a proposed technique, which is a first related art of the present invention, reverberations are removed in an active sonar device for detecting moving target objects, by using difference in frequency due to the Doppler effect between a reflected wave from a target object and reverberation (see PTL 1, for example).

According to another proposed technique, which is a second related art of the present invention, reverberations from the bottom or surface of water are separated from reflected waves coming from a target object in an active sonar device for detecting a stationary object, by changing frequency settings for a variable band-stop filter over time (see PTL 2, for example).

According to another proposed technique, which is a third related art of the present invention, an active sonar device called a bi-static or multi-static system where a transmitter and a receiver are located with a certain distance apart, includes a transmitter continuously transmitting an acoustic signal, and a receiver receiving a reflected signal of the acoustic signal reflected from an object and a direct acoustic signal from the transmitter, wherein the receiver performs processing to discriminate the direct acoustic signal from the reflected signal received from the object while the transmitter is transmitting signals (see PTL 3 and PTL 4, for example).

According to another proposed technique, which is a fourth related art of the present invention, in an active sonar device, a transmitter and a receiver are disposed apart from each other by a predetermined distance so as to reduce the effects of acoustic signals from the transmitter (see PTL 5, for example).

CITATION LIST

Patent Literature

[PTL 1]
Japanese Patent No. 3367462
[PTL 2]
Japanese Unexamined Patent Application Publication No. 2001-174545
[PTL 3]
U.S. Pat. No. 7,852,709
[PTL 4]
Japanese Unexamined Patent Application Publication (Translation of PCT Application) No. 2007-507691
[PTL 5]
U.S. Pat. No. 4,961,174

SUMMARY OF INVENTION

Technical Problem

By the way, interfering signals affecting the detection performance of a device that detects a target by transmitting a wave and receiving a reflected wave from the target may include scattered waves reaching the reception unit due to scattering caused by the medium through which a wave propagates, in addition to reverberations from the bottom or surface of water and direct acoustic signals from the transmitter. Although the extent of influence exerted by such scattered waves is presumably related to the distance between the transmission unit and reception unit and to shapes and directions of beams for the transmission unit and reception unit, no literature is known to have conducted a theoretical analysis concerning how such specifications of the transmission unit and reception unit have effects. Thus, it has been conventionally difficult to control specifications of the transmission unit and reception unit so as to reduce the effects of this sort of scattered waves.

An object of the present invention is to provide a target detection device that solves the problem as described above, that is, the difficulty in controlling specifications of the transmission unit and reception unit so as to reduce the effects of scattered waves reaching the reception unit due to scattering caused by the medium through which a wave propagates.

Solution to Problem

A target detection device according to the first aspect of the present invention comprises: a transmission unit that transmits a wave; a reception unit that receives a reflected wave of the wave, the reflected wave being reflected from a detection target object; a detection unit that detects the detection target object based on an output of the reception unit; and a control unit that controls specifications of the transmission unit and the reception unit in such a way that the specifications satisfy a relational equation for reducing effects of a scattered wave reaching the reception unit due to scattering caused by a medium through which the wave propagates.

A target detection method according to the second aspect of the present invention is a target detection method executed by a target detection device that includes a transmission unit, a reception unit, a detection unit, and a control unit, wherein the control unit controls specifications of the transmission unit and the reception unit in such a way that the specifications satisfy a relational equation for reducing effects of a scattered wave reaching the reception unit due to scattering caused by a medium through which a wave propagates, wherein the transmission unit transmits the wave, wherein the reception unit receives a reflected wave of the wave, the reflected wave being reflected from a detection target object, and wherein the detection unit detects the detection target object based on an output of the reception unit.

A program according to the third aspect of the present invention causes a computer connected to a transmission unit that transmits a wave and to a reception unit that receives a reflected wave of the wave, the reflected wave being reflected from a detection target object, to function as: a control unit that controls specifications of the transmission unit and the reception unit in such a way that the specifications satisfy a relational equation for reducing effects of a scattered wave reaching the reception unit due to scattering caused by a medium through which the wave propagates.

Advantageous Effect of Invention

With the above-described configurations, the present invention makes it possible to control specifications of the transmission unit and reception unit so as to reduce the effects of scattered waves reaching the reception unit due to scattering caused by the medium through which a wave propagates.

BRIEF DESCRIPTION OF DRAWINGS

FIG. 8 shows equations representing processes of deriving the relational equation used for the second exemplary embodiment of the present invention.

FIG. 9 shows equations representing processes of deriving the relational equation used for the second exemplary embodiment of the present invention.

FIG. 17 shows the relational equation used for a third exemplary embodiment of the present invention, as well as an equation representing a process of deriving the relational equation.

FIG. 18 shows the relational equation used for a fourth exemplary embodiment of the present invention.

FIG. 20 shows equations representing processes of deriving the relational equation used for the fourth exemplary embodiment of the present invention.

FIG. 21 shows equations representing processes of deriving the relational equation used for the fourth exemplary embodiment of the present invention.

FIG. 22 shows the relational equation used for a fifth exemplary embodiment of the present invention, as well as equations representing processes of deriving the relational equation.

FIG. 23 shows the relational equation used for the fifth exemplary embodiment of the present invention, as well as an equation representing a process of deriving the relational equation.

DESCRIPTION OF EMBODIMENTS

Exemplary embodiments of the present invention will now be described in detail with reference to the drawings.

[First Embodiment]

Figure 1:
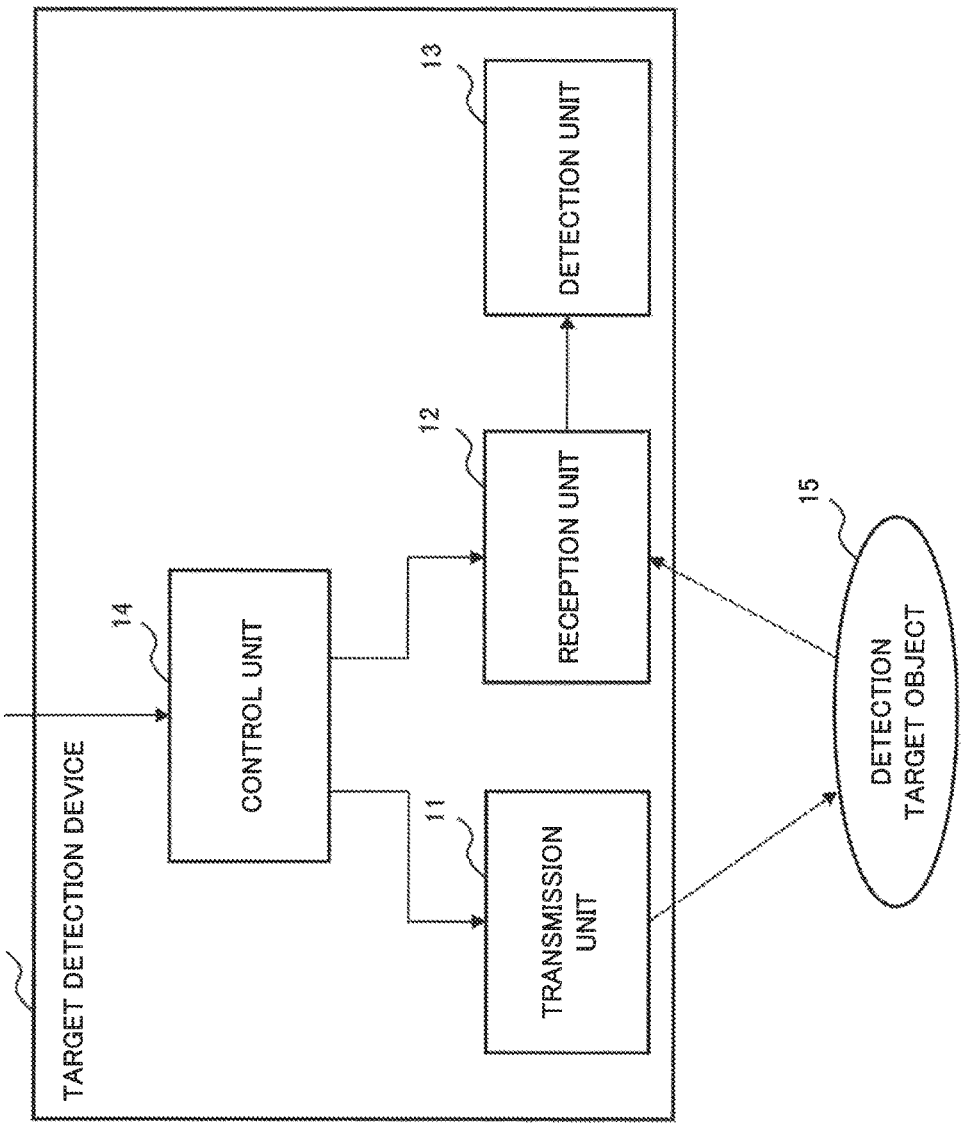
FIG. 1 is a block diagram illustrating a target detection device according to a first exemplary embodiment of the present invention.

With reference to FIG. 1, a target detection device 10 according to a first exemplary embodiment of the present invention is an active sonar device having a function to detect a target object present in water by transmitting a sound wave and receiving a reflected wave. The target detection device 10 includes main components: a transmission unit 11, a reception unit 12, a detection unit 13, and a control unit 14.

The transmission unit 11 has a function to transmit a sound wave. The reception unit 12 has a function to receive a reflected wave of the sound wave reflected from the target object, namely a detection target object 15. The detection unit 13 has a function to detect the detection target object 15 based on an output of the reception unit 12. The transmission unit 11, the reception unit 12, and the detection unit 13 are well-known basic components of an active sonar device.

The control unit 14 has a function to control specifications of the transmission unit 11 and reception unit 12 so as to reduce the effects of a scattered wave. The control unit 14 controls specifications of the transmission unit 11 and reception unit 12, including, for example, the distance between the transmission unit 11 and reception unit 12, and shapes and directions of beams for the transmission unit 11 and reception unit 12, in such a way that the specifications satisfy a relational equation used for reducing the effects of a scattered wave reaching the reception unit 12 due to scattering caused by water (e.g., seawater), which constitutes the medium through which a sound wave, i.e., wave, propagates. The aforementioned relational equation represents a condition that must be satisfied by parameters representing specifications of the transmission unit 11 and reception unit 12 so as to reduce the effects of a scattered wave.

Figure 2:
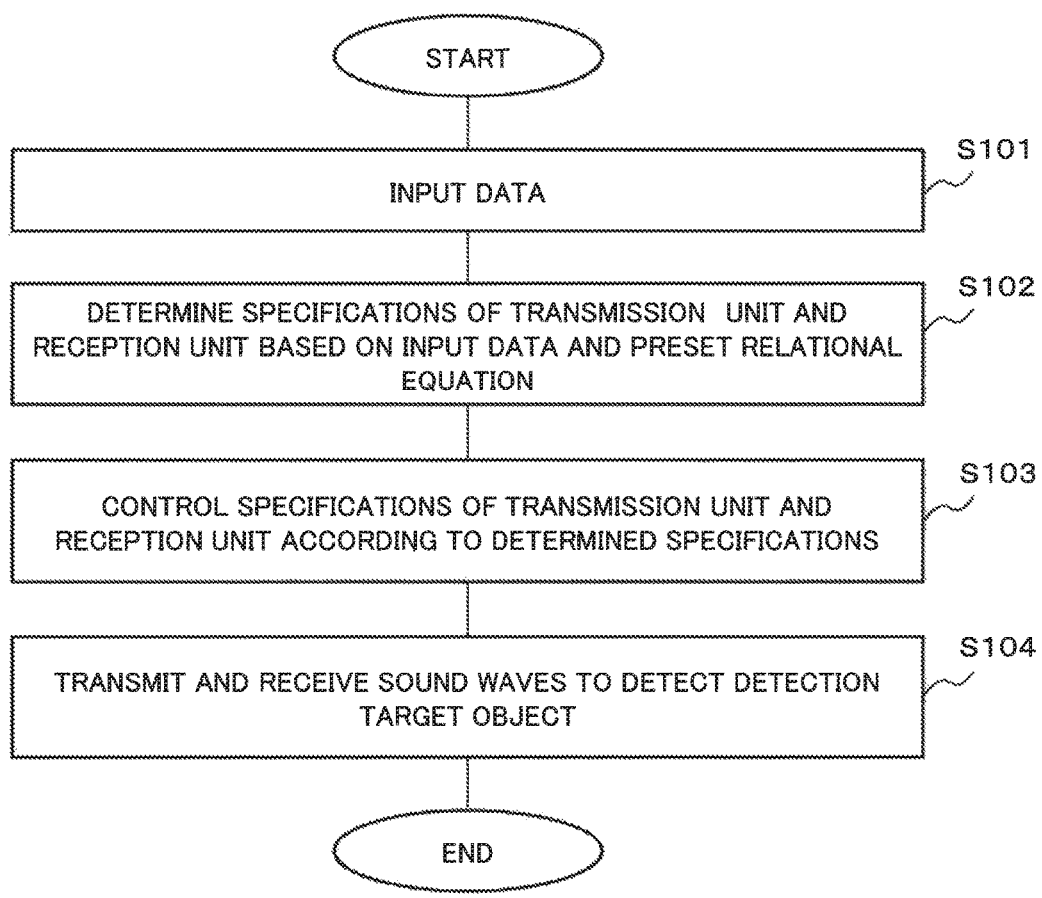
FIG. 2 is a flowchart illustrating operations of the target detection device according to the first exemplary embodiment of the present invention.

FIG. 2 is a flowchart illustrating operation of the target detection device 10 according to the present exemplary embodiment. The following describes operations of the target detection device 10 referring to FIG. 2.

The control unit 14 in the target detection device 10 accepts from outside the data needed for controls (Step S101). Next, the control unit 14 determines specifications of the transmission unit 11 and reception unit 12 based on the input data and a preset relational equation (Step S102). Then, the control unit 14 controls specifications of the transmission unit 11 and reception unit 12 in such a way that the specifications match the determined specifications (Step S103).

Subsequently, the device performs detection of the detection target object by transmitting and receiving sound waves (Step S104). Specifically, the transmission unit 11 transmits a sound wave and the reception unit 12 receives a reflected wave of the sound wave in accordance with the controlled specifications, and then the detection unit 13 detects the detection target object 15 based on an output of the reception unit 12.

As seen above, the present exemplary embodiment may achieve controlling specifications of the transmission unit 11 and reception unit 12 so as to reduce the effects of a scattered wave reaching the reception unit 12 due to scattering caused by water, which constitutes the medium through which a sound wave, i.e., wave, propagates. This is because the control unit 14 controls specifications of the transmission unit 11 and reception unit 12 in such a way that the specifications satisfy the relational equation used for reducing the effects of a scattered wave reaching the reception unit 12 due to scattering caused by the medium.

[Second Embodiment]

A second exemplary embodiment of the present invention will now be described. In the present exemplary embodiment, details of the control unit 14 in the target detection device 10 according to the first exemplary embodiment are described.

The control unit 14 has a function to control specifications of the transmission unit and reception unit in such a way that the specifications satisfy a relational equation used for reducing the effects of a scattered wave reaching the reception unit due to scattering caused by the medium through which a wave propagates. The control unit 14 includes main functional units: a communication interface unit (hereinafter referred to as communication I/F unit) 141, an operation input unit 142, a screen display unit 143, a storing unit 144, and a computation processing unit 145.

The communication I/F unit 141, which is composed of dedicated data communication circuits, has a function to perform data communications with various devices such as the transmission unit 11 and the reception unit 12 connected to the communication I/F unit via a communication line.

The operation input unit 142, which is composed of operation input devices such as a keyboard or mouse, has a function to detect an operation made by the operator and give an output to the computation processing unit 145.

The screen display unit 143, which is composed of a screen display device such as a liquid crystal display (LCD) or a plasma display panel (PDP), has a function to display various types of information such as operation menus on the screen in response to an instruction from the computation processing unit 145.

The storing unit 144, which is composed of a storage device such as a hard disc or a memory, has a function to store a program 1441 and processing information needed for various processes performed by the computation processing unit 145. The program 1441, which is a program to be loaded and run on the computation processing unit 145 to implement various processing units, is read in advance from an external device (not illustrated) or a storage medium (not illustrated) via the data input/output functions such as the communication I/F unit 141 and stored in the storing unit 144. Major processing information stored in the storing unit 144 includes a relational equation 1442, input data 1443, and calculated data 1444.

The relational equation 1442 is an equation representing, with some parameters, a condition that need to be satisfied by specifications of the transmission unit and reception unit, so as to reduce the effects of a scattered wave reaching the reception unit due to scattering caused by the medium through which a wave propagates. Equation 1 shown in FIG. 4 is an example of the relational equation 1442.

Equation 1 has six parameters: SL, Sv, a, b, d, and AL. The individual parameters represent as follows. SL is a transmission level of the transmission unit 11, $S_v (=10 \log s_v)$ is a backscattering intensity, a and b are shapes of beams for the transmission unit 11 and reception unit 12, d is a distance between the transmission unit 11 and reception unit 12, and AL is an acceptable level of scattering level. In other words, Equation 1 represents that a value of $SL+Sv+10 \log(\pi^{3/2} a^2 b/d)$ must be equal to or less than AL so as to make the level of a scattered wave reaching the reception unit 12 be equal to or less than the acceptable level AL. Thus, supposing that values of some parameters are known, then the remaining unknown parameter value can be determined based on the known values and Equation 1. For example, if SL, Sv, a, b, and AL are given, an optimal value of d is determined.

Figures 4, 5:
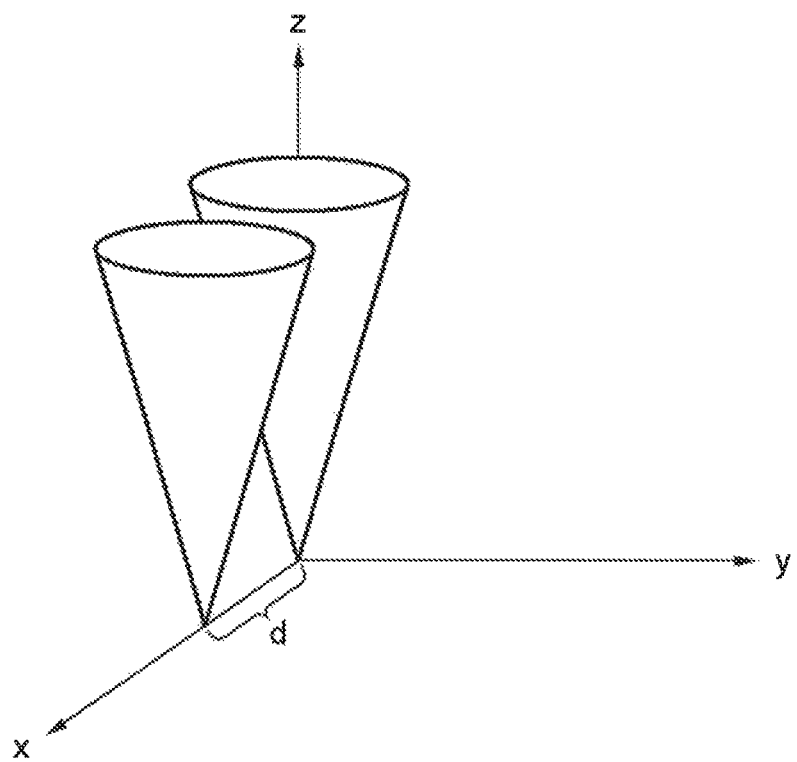
FIG. 4 shows a relational equation used for the second exemplary embodiment of the present invention.
FIG. 5 is a schematic diagram illustrating specifications of the transmission unit and reception unit conceived for deriving the relational equation used for the second exemplary embodiment of the present invention.
Figure 6:
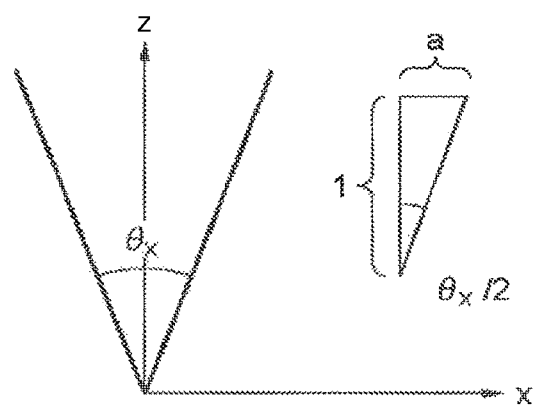
FIG. 6 is a cross-sectional view of a beam taken along the x-axis direction.
Figure 7:
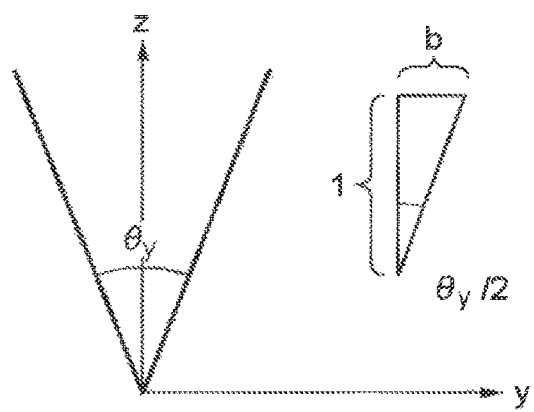
FIG. 7 is a cross-sectional view of a beam taken along the y-axis direction.

FIGS. 5 to 7 are schematic diagrams illustrating specifications of the transmission unit 11 and reception unit 12 conceived for deriving Equation 1. The following describes processes of deriving Equation 1 referring to FIGS. 5 to 7.

[Process of Deriving Equation 1]

As illustrated in FIG. 5, it is assumed that the transmission unit 11 and reception unit 12 are disposed on an x-y plane, both the transmission beam and the reception beam are in the same shape, and both are directed in a positive direction of the z axis. Each of the beams is a Gaussian and has a center axis along the z axis. Every cross section of a beam parallel to the x-y plane is a two-dimensional Gaussian, described as Equation 2 in FIG. 8. To make a Gaussian spread in a positive direction of the z axis, Equation 2 is modified to Equation 3 in FIG. 8.

As illustrated in FIG. 6, the beamwidth in the X direction is denoted as $\theta_x$, and $\tan(\theta_x/2)=a$ is given. As illustrated in FIG. 7, the beamwidth in the Y direction is denoted as $\theta_y$, and $\tan(\theta_y/2)=b$ is given. In addition, it is assumed that the reception beam is coaxial with the z axis and the transmission beam, which is identical in shape with the reception beam, is present at a position distant from the reception beam by d in a positive direction of the x axis. That is, d is defined as the distance between the transmission unit 11 and the reception unit 12. This transmission beam is described as Equation 4 in FIG. 8. In other words, it is assumed that the reception point is at the origin (0, 0, 0) while the transmission point is at (d, 0, 0).

A sound intensity on an axis per unit distance is denoted as $I_0$. Since the distance from the transmission point of a coordinate point (x, y, z) is $\{(x-d)^2+y^2+z^2\}^{1/2}$, the intensity of a sound incoming to a micro volume dxdydz at a coordinate point (x, y, z) is expressed as $I_0B_2 (x, y, z)/\{(x-d)^2+y^2+z^2\}$. Let $S_v=10 \log s_v$ be a backscattering intensity, then the scattering intensity caused by the micro volume dxdydz at the reception point is defined by Equation 5 in FIG. 8. Since this is received with the beam $B_1 (x, y, z)$, an output voltage of the reception unit 12 is expressed as Equation 6 in FIG. 8. The response is assumed to be 1 here. Thus, scattering in the whole region (reverberation) R is obtained by integrating Equation 6, as represented by Equation 7 in FIG. 8.

The integration according to Equation 7 cannot be solved analytically. Thus, an approximation is made as described below. The scattering on each micro volume is only dependent on a distance from the x-y plane, i.e., only dependent on z. This is true as long as the beamwidth is sufficiently small. As a distance from the x-y plane is longer, the beam is more spread, but a wider beam would have little influence on scattering, because the scattering becomes small as the distance is longer. An approximation according to this policy leads the aforementioned integration to Equation 8 in FIG. 8.

The integration defined by Equation 8 is performed as described below. First, integration is performed with respect to x and y. The integration can be performed on x and y independently. Equation 9 in FIG. 9 shows the integration with respect to x. Equation 10 in FIG. 9 shows the integration with respect to y. Accordingly, Equation 8 is turned into Equation 11 in FIG. 9. The integration with respect to z is defined by Equation 12 in FIG. 9 because the variable transformation $(1/z)=t$ leads to $(-1/z^2)dz=dt$. Therefore, the result of integration is represented by Equation 13 in FIG. 9. The scattering level RL' on a logarithmic scale is defined by Equation 14 in FIG. 9. Equation 1 appearing above represents the condition that the scattering level RL' should be equal to or less than an acceptable level AL. The above are processes of deriving Equation 1.

Figure 3:
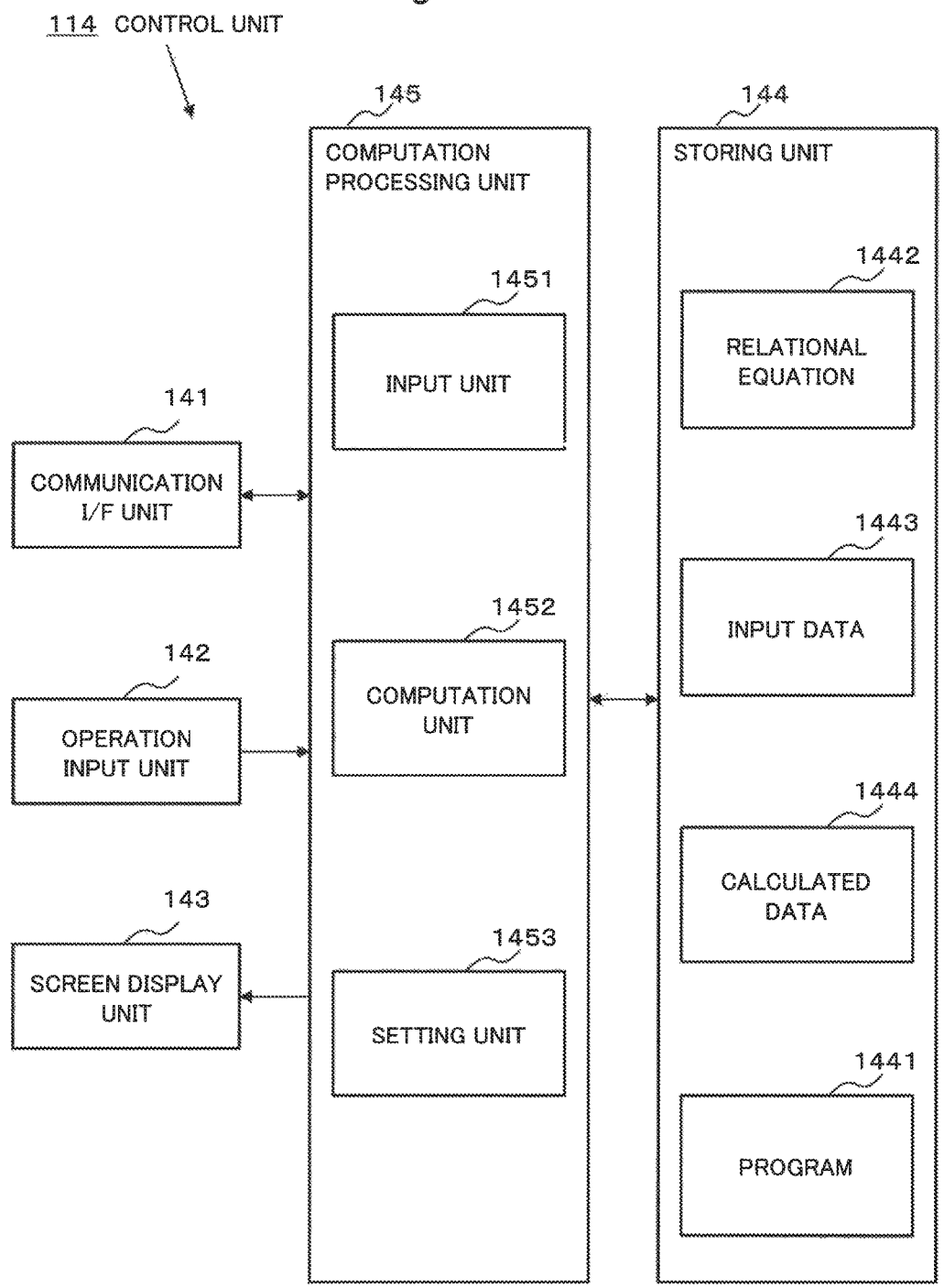
FIG. 3 is a block diagram illustrating a control unit in the target detection device according to a second exemplary embodiment of the present invention.

With reference to FIG. 3 again, the input data 1443 is composed of known parameter values among a plurality of parameters included in the relational equation 1442.

The calculated data 1444 is composed of an unknown parameter value among parameters in the relational equation 1442, the value having been calculated based on the relational equation 1442 and input data 1443.

The computation processing unit 145, which has a microprocessor (e.g., MPU) and its peripheral circuitry, has a function to implement various processing units by reading the program 1441 from the storing unit 144 and executing it, through collaboration between the above-described hardware and the program 1441. Major processing units implemented by the computation processing unit 145 include an input unit 1451, a computation unit 1452, and a setting unit 1453.

The input unit 1451 has a function to accept data from the operation input unit 142 or the communication I/F unit 141 and store the data, designated as input data 1443, into the storing unit 144.

Figure 10:
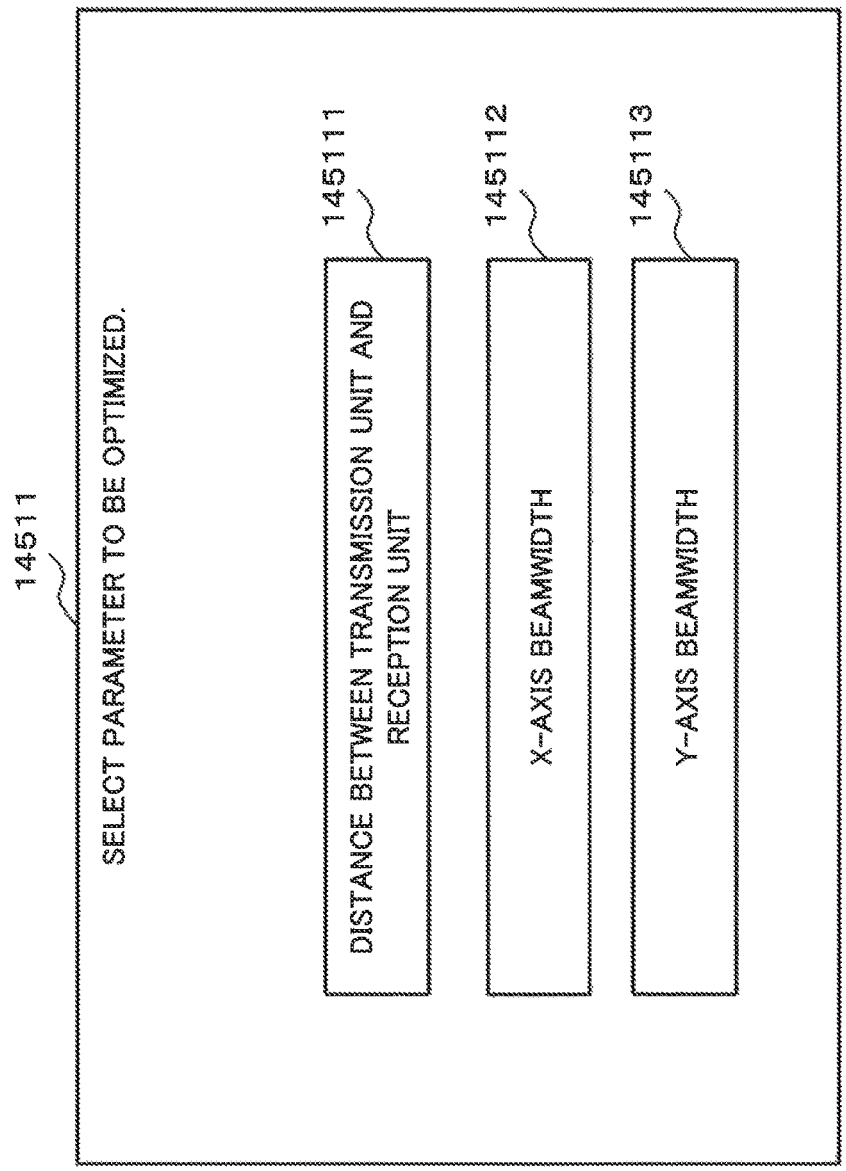
FIG. 10 is a diagram illustrating an example of the data input screen used by the control unit in the target detection device according to the second exemplary embodiment of the present invention.

FIGS. 10 to 13 show examples of the data input screen displayed on the screen display unit 143 by the input unit 1451. First, the input unit 1451 displays the data input screen 14511 as illustrated in FIG. 10 on the screen display unit 143. The data input screen 14511 displays buttons 145111 to 145113 for selecting a parameter to be optimized. The operator selects a parameter to be optimized by operating any of these selection buttons.

Figure 11:
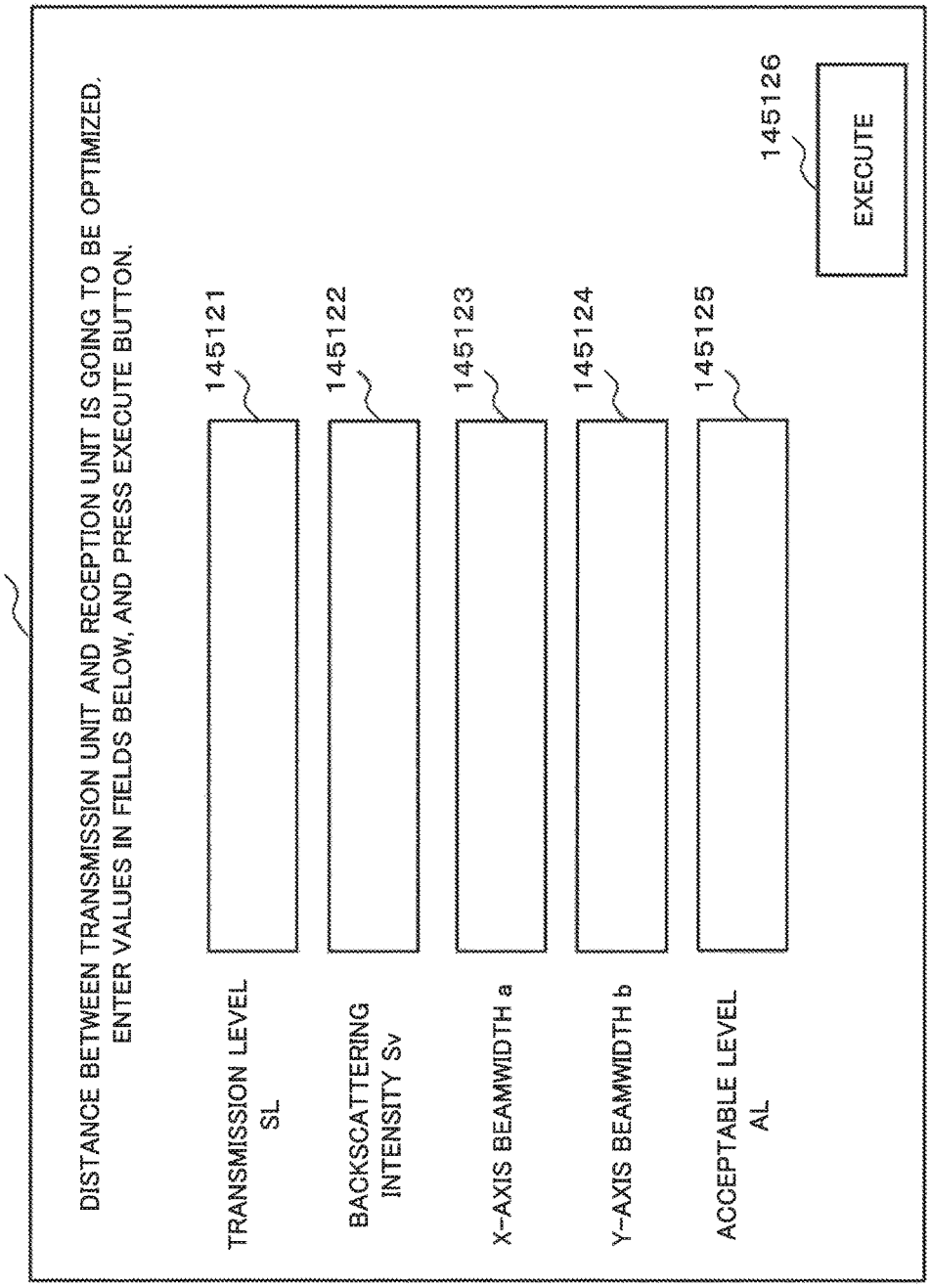
FIG. 11 is a diagram illustrating a first example of the data input screen used by the control unit in the target detection device according to the second exemplary embodiment of the present invention.

When the selection button 145111 is operated, the input unit 1451 determines the distance between the transmission unit and reception unit to be optimized, and displays the data input screen 14512 as illustrated in FIG. 11 on the screen display unit 143. The data input screen 14512 displays an input field 145121 for transmission level SL, an input field 145122 for backscattering intensity $S_v$, an input field 145123 for X-axis beamwidth a, an input field 145124 for Y-axis beamwidth b, an input field 145125 for acceptable level AL, and an execution button 145126. The operator enters desired values through the operation input unit 142 into the input fields 145121 to 145125, and operates the execution button 145126. Then, the input unit 1451 saves the input data 1443, namely the individual parameter values that have been entered into the input fields 145121 to 145125, into the storing unit 144.

Figure 12:
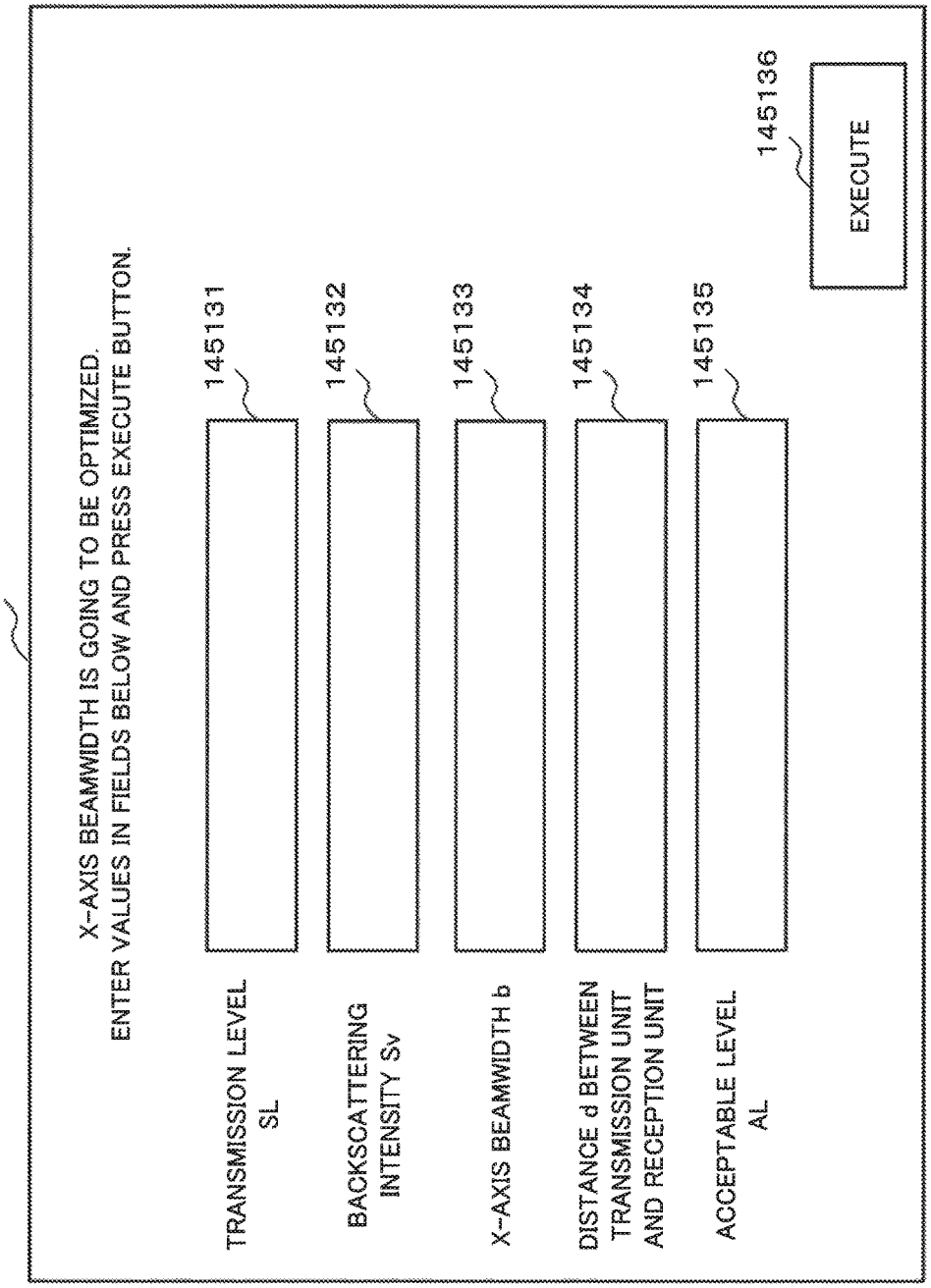
FIG. 12 is a diagram illustrating a second example of the data input screen used by the control unit in the target detection device according to the second exemplary embodiment of the present invention.

When the selection button 145112 is operated, the input unit 1451 determines the X-axis beamwidth to be optimized, and displays the data input screen 14513 as illustrated in FIG. 12 on the screen display unit 143. The data input screen 14513 displays an input field 145131 for transmission level SL, an input field 145132 for backscattering intensity $S_v$, an input field 145133 for Y-axis beamwidth b, an input field 145134 for distance d between transmission unit and reception unit, an input field 145135 for acceptable level AL, and an execution button 145136. The operator enters desired values through the operation input unit 142 into the input fields 145131 to 145135, and operates the execution button 145136. Then, the input unit 1451 saves the input data 1443, namely the individual parameter values that have been entered into the input fields 145131 to 145135, into the storing unit 144.

Figure 13:
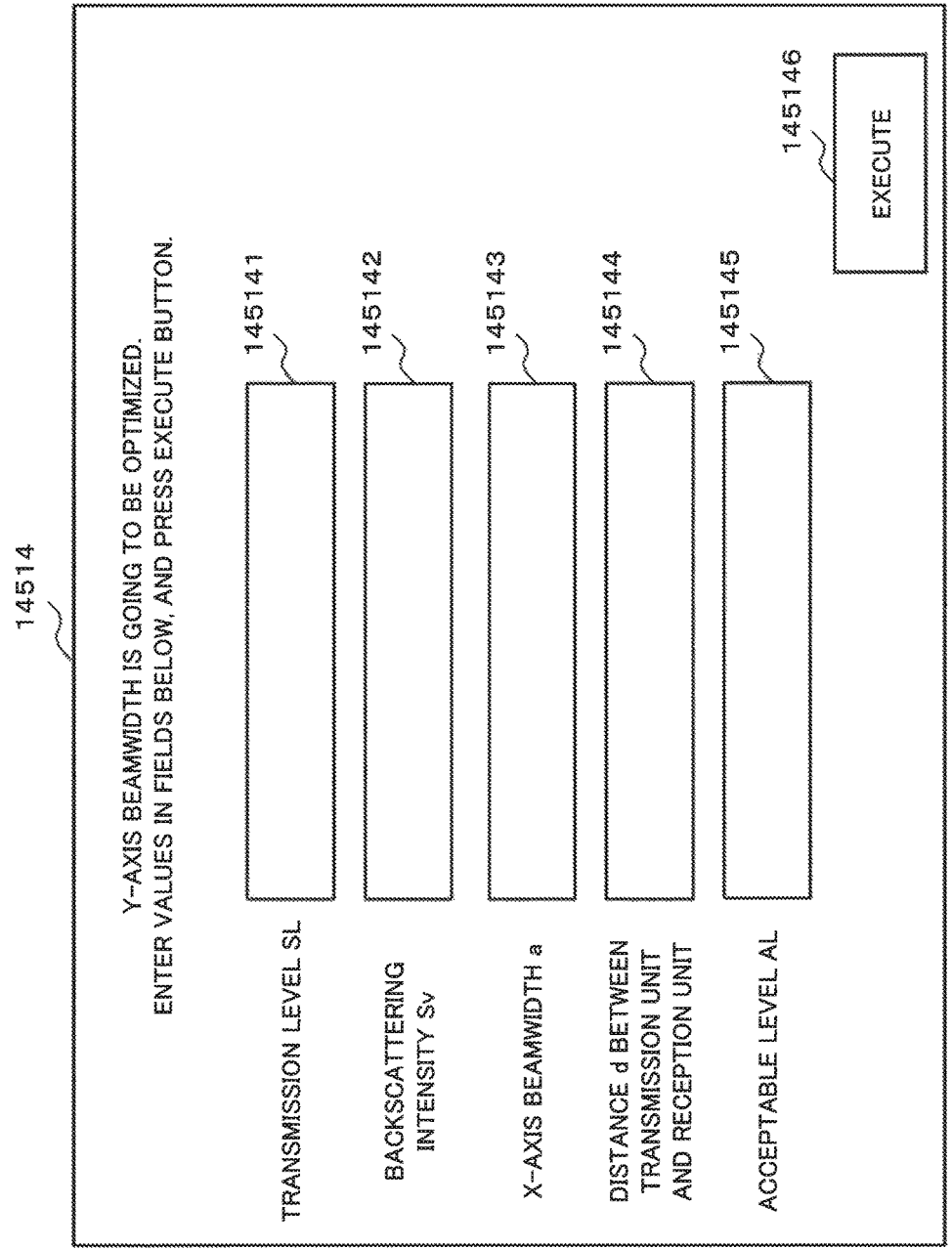
FIG. 13 is a diagram illustrating a third example of the data input screen used by the control unit in the target detection device according to the second exemplary embodiment of the present invention.

When the selection button 145113 is operated, the input unit 1451 determines the Y-axis beamwidth to be optimized, and displays the data input screen 14514 as illustrated in FIG. 13 on the screen display unit 143. The data input screen 14514 displays an input field 145141 for transmission level SL, an input field 145142 for backscattering intensity Sv, an input field 145143 for X-axis beamwidth a, an input field 145144 for distance d between transmission unit and reception unit, an input field 145145 for acceptable level AL, and an execution button 145146. The operator enters desired values through the operation input unit 142 into the input fields 145141 to 145145, and operates the execution button 145146. Then, the input unit 1451 saves the input data 1443, namely the individual parameter values that have been entered into the input fields 145141 to 145145, into the storing unit 144.

In the above example, the input unit 1451 displays the data input screen on the screen display unit 143 and accepts data from the operation input unit 142. Alternatively, the input unit 1451 may display the data input screen on a remote terminal device connected via the communication I/F unit 141 and accept data from the terminal device.

The computation unit 1452 has a function to read the relational equation 1442 and input data 1443 from the storing unit 144, calculate a parameter value to be optimized based on the relational equation 1442 and input data 1443, and saves the calculated value, designated as calculated data 1444, into the storing unit 144. Specifically, the computation unit 1452 calculates a parameter value to be optimized by assigning the input data 1443 to known parameters among a plurality of parameters in the relational equation 1442 and solving the relational equation 1442 with respect to an unknown parameter.

The setting unit 1453 has a function to read input data 1443 and calculated data 1444 from the storing unit 144 and control specifications of the transmission unit 11 and reception unit 12 based on the input data 1443 and calculated data 1444.

Figure 14:
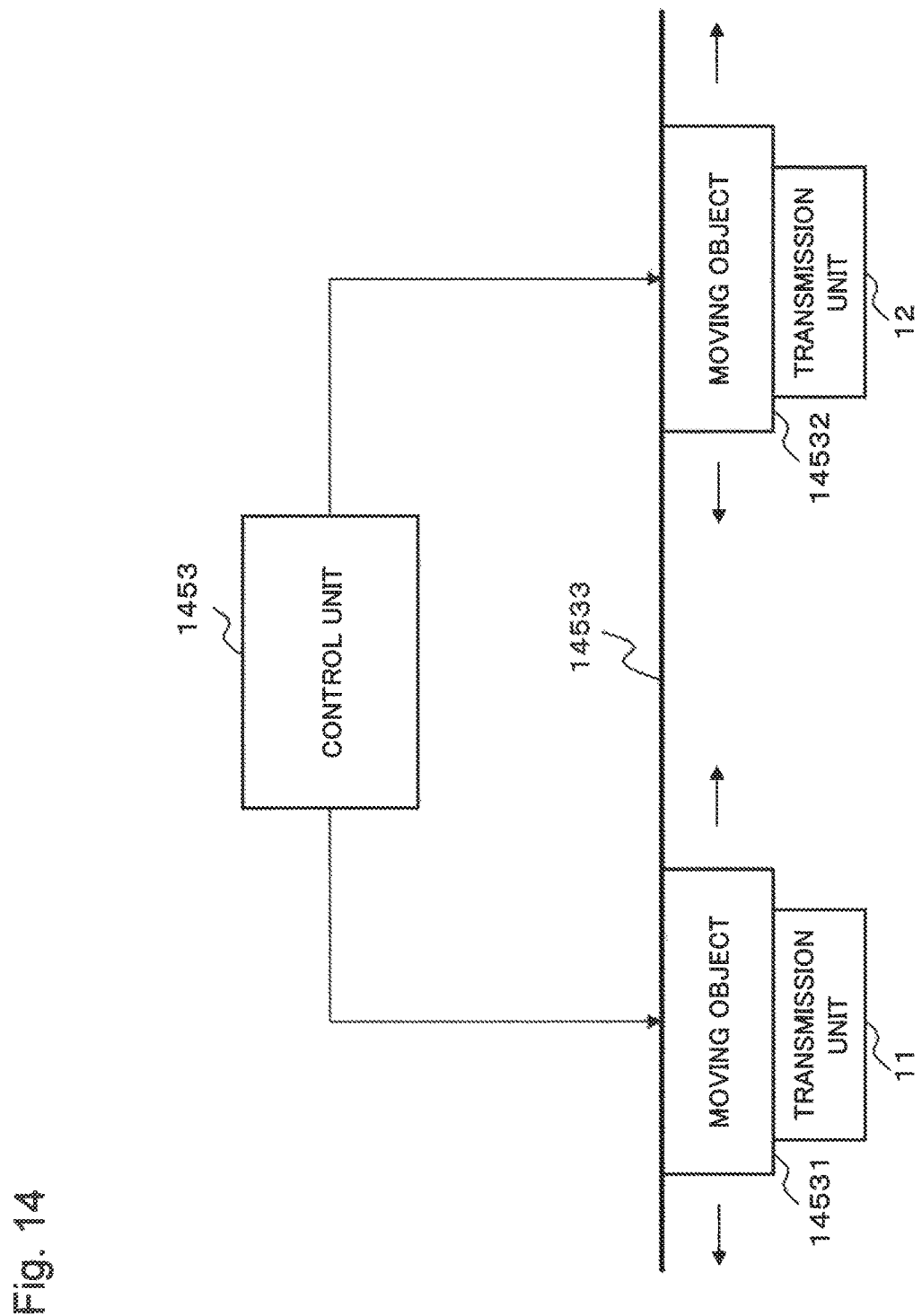
FIG. 14 is a diagram illustrating an example configuration for controlling specifications of the transmission unit and reception unit according to the second exemplary embodiment of the present invention.

FIG. 14 illustrates an example configuration for controlling specifications of the transmission unit 11 and reception unit 12. With reference to FIG. 14, the transmission unit 11 is mounted on a moving object 14531 and the reception unit 12 is mounted on a moving object 14532. The movable bodies 14531 and 14532 move in parallel with the X axis along a guide member 14533, such as a rail disposed on the ship bottom, in accordance with an instruction given by the setting unit 1453. The setting unit 1453 controls the distance between the transmission unit 11 and reception unit 12 by adjusting the positions of the movable bodies 14531 and 14532.

Figure 15:
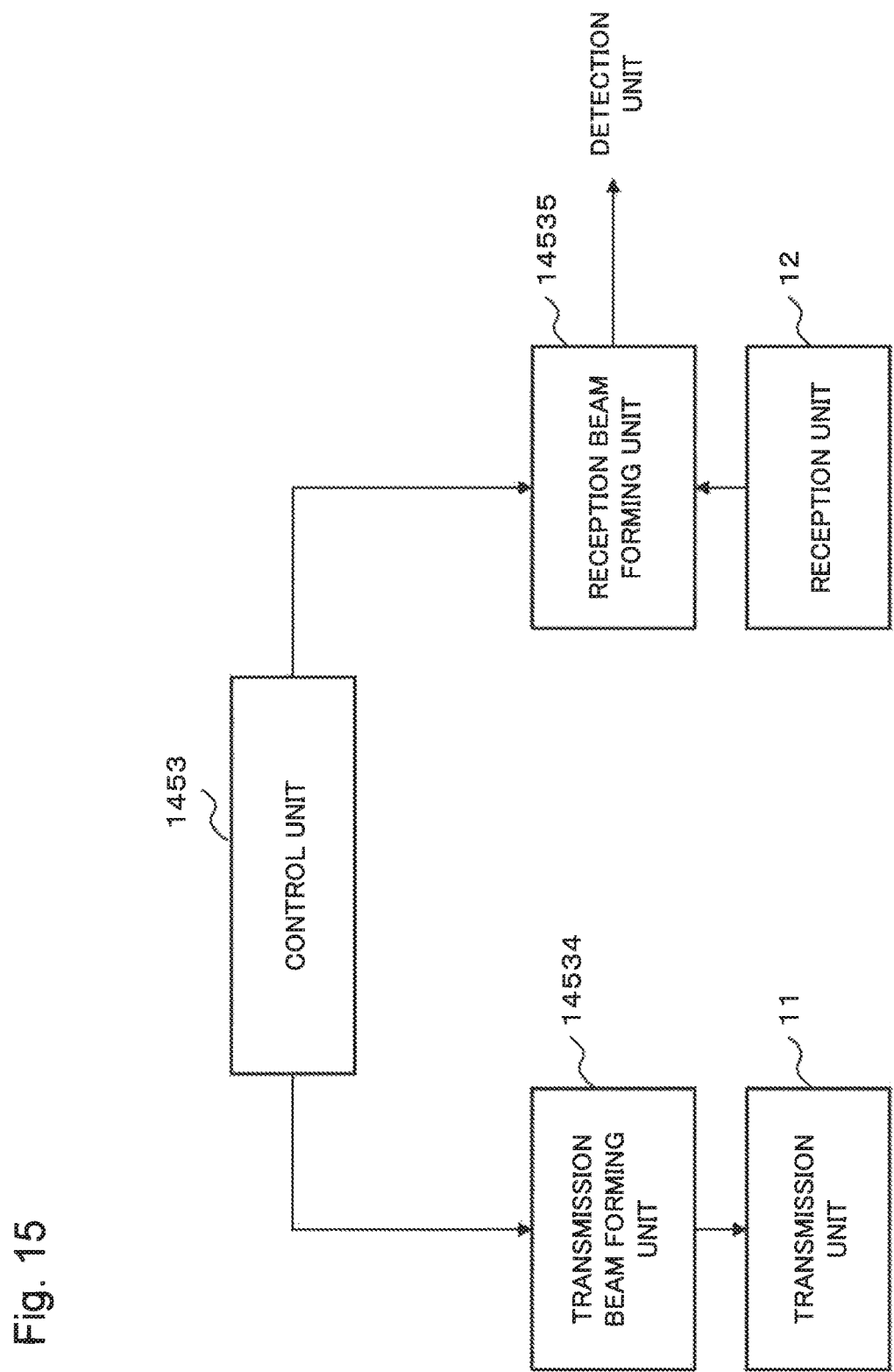
FIG. 15 is a diagram illustrating another example configuration for controlling specifications of the transmission unit and reception unit according to the second exemplary embodiment of the present invention.

FIG. 15 illustrates another example configuration for controlling specifications of the transmission unit 11 and reception unit 12. With reference to FIG. 15, a transmission beam forming unit 14534 forming a transmission beam shape of the transmission unit 11 and a reception beam forming unit 14535 forming a reception beam shape of the reception unit 12 are disposed. The setting unit 1453 controls the transmission beam and reception beam in such a way that these beams are formed into desired shapes by giving instructions to the transmission beam forming unit 14534 and reception beam forming unit 14535.

Figure 16:
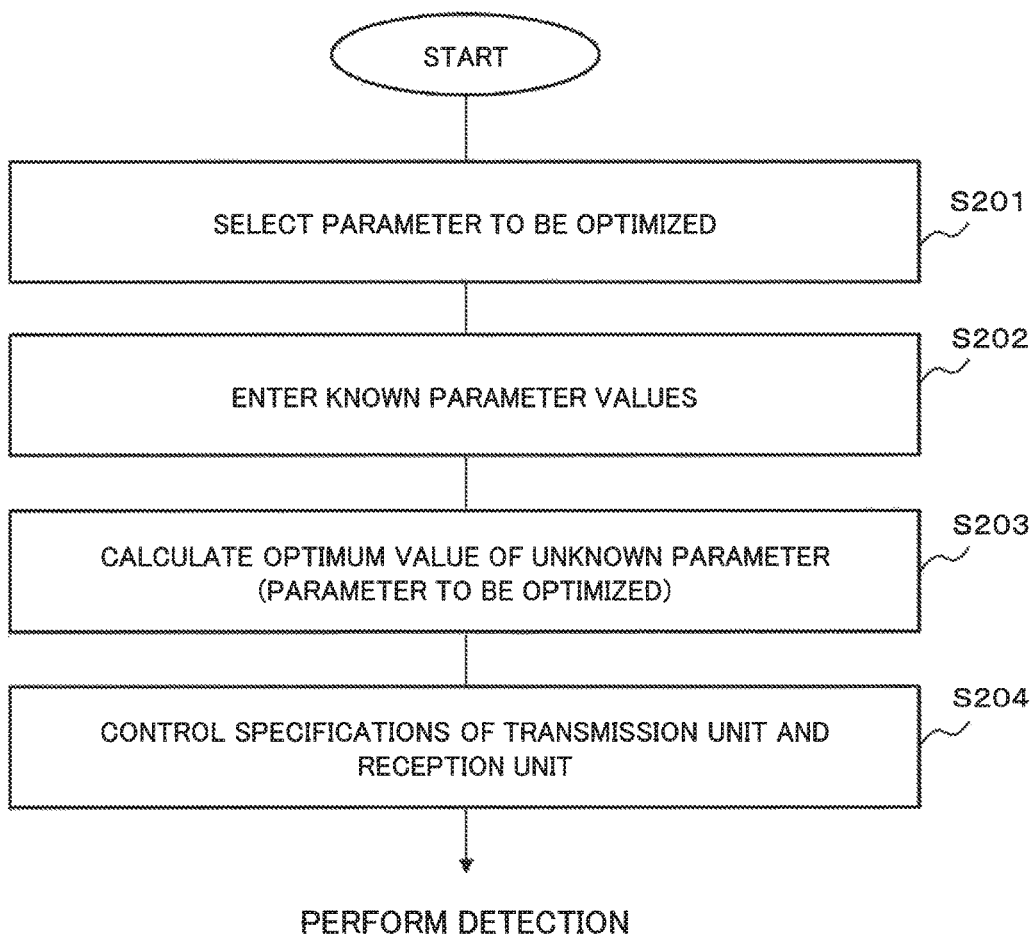
FIG. 16 is a flowchart illustrating operations of the control unit in the target detection device according to the second exemplary embodiment of the present invention.

FIG. 16 is a flowchart illustrating operations of the control unit 14 according to the present exemplary embodiment. The following describes operations of the control unit 14 referring to FIG. 16.

First, the input unit 1451 in the control unit 14 displays the data input screen 14511 as illustrated in FIG. 10 on the screen display unit 143, and causes the operator to select a parameter to be optimized via the selection buttons 145111 to 145113 (Step S201). Next, the input unit 1451 displays, on the screen display unit 143, the data input screens 14512 to 14514, as illustrated in FIGS. 11 to 13, depending on the selected type of parameter to be optimized, and causes the operator to enter known parameter values (Step S202).

Then, the computation unit 1452 in the control unit 14 calculates an unknown parameter value to be optimized, based on the known parameter values that have been entered and the relational equation defined by Equation 1 (Step S203). For example, when the operator selects the distance between the transmission unit and the reception unit as the item to be optimized and enters, through the data input screen 14512, values of the transmission level SL, backscattering intensity $S_v$, X-axis beamwidth a, Y-axis beamwidth b, and acceptable level AL, the computation unit 1452 assigns these values to Equation 1 and calculates an optimum value, which is a minimum value of the distance d between the transmission unit and the reception unit satisfying the relational equation 1. Or, when the operator selects the X-axis beamwidth as the item to be optimized and enters, through the data input screen 14513, values of the transmission level SL, backscattering intensity $S_v$, Y-axis beamwidth b, distance d between the transmission unit and the reception unit, and acceptable level AL, the computation unit 1452 assigns these values to Equation 1 and calculates an optimum value, which is a minimum value of the X-axis beamwidth a satisfying the relational equation 1. Or, when the operator selects the Y-axis beamwidth as the item to be optimized and enters, through the data input screen 14514, values of the transmission level SL, backscattering intensity $S_v$, X-axis beamwidth a, distance d between the transmission unit and the reception unit, and acceptable level AL, the computation unit 1452 assigns these values to Equation 1 and calculates an optimum value, which is a minimum value of the Y-axis beamwidth b satisfying the relational equation 1.

Then, the setting unit 1453 in the control unit 14 controls specifications of the transmission unit 11 and reception unit 12, based on the known parameter values that have been entered by the operator and the unknown parameter value that has been calculated (Step S204). Specifically, the setting unit 1453 adjusts the distance between the transmission unit 11 and the reception unit 12 in such a way that the distance matches the value of the parameter d, by moving at least one of the movable bodies 14531 and 14532 illustrated in FIG. 14. In addition, the setting unit 1453 adjusts the shapes of a transmission beam for the transmission unit 11 and a reception beam for the reception unit 12 in such a way that the shapes match the parameters a and b, by giving instructions to the transmission beam forming unit 14534 and the reception beam forming unit 14535 illustrated in FIG. 15. The setting unit 1453 also controls the level of transmission by the transmission unit 11 in such a way that the level matches the parameter SL. Other specifications of the transmission unit and the reception unit, including the orientation of a beam and the like, may be set to fixed values in advance, or may be set to predetermined states by the setting unit 1453 on a case-by-case basis.

After the setting unit 1453 makes settings of specifications of the transmission unit and the reception unit, a sound wave is transmitted and received to detect the detection target object.

In this way, the present exemplary embodiment may achieve controlling specifications of the transmission unit 11 and the reception unit 12 so as to reduce the effects of a scattered wave reaching the reception unit 12 due to scattering caused by water, which constitutes the medium through which a sound wave, i.e., wave, propagates. This is because the control unit 14 controls specifications of the transmission unit 11 and the reception unit 12 in such a way that the specifications satisfy Equation 1, which is an equation used for reducing the effects of a scattered wave reaching the reception unit 12 due to scattering caused by the medium, the control unit 14 having Equation 1, i.e., the parameter SL representing the level of transmission of the transmission unit 11, the parameter $S_v$ representing a backscattering intensity of the medium, the parameters a and b representing shapes of beams for the transmission unit 11 and reception unit 12, the parameter d representing the distance between the transmission unit and the reception unit, and the parameter AL representing an acceptable level of transmission level.

[Third Embodiment]

A third exemplary embodiment of the present invention will now be described.

While the second exemplary embodiment uses Equation 1 in FIG. 4 as the relational equation 1442, the present exemplary embodiment employs Equation 15 shown in FIG. 17 as the relational equation 1442. The following describes processes of deriving Equation 15.

[Process of Deriving Equation 15]

As an indicator of indicating the ease of detecting the target, the ratio of the level of reflection from the target to the level of reverberation is considered. The level of reverberation is represented by R', which is given in Equation 13 appearing in the processes of deriving Equation 1. Thus, letting E be the level of reflection from the target, the indicator is expressed as E/R'. The level E of reflection from the target is proportional to $I_0$ (sound intensity on an axis per unit distance). Thus, E/R' is not dependent on $I_0$ as seen in Equation 16 in FIG. 17. That is, E/R' is not dependent on SL. Given that E/R' is equal to or greater than a predetermined threshold α, as a condition for reducing the effects of reverberation, Equation 15 in FIG. 17 is satisfied.

In the present exemplary embodiment, Equation 15, which is used as the relational equation 1442, has the parameter $S_v$ representing a backscattering intensity of the medium, the parameters a, b representing shapes of beams for the transmission unit 11 and reception unit 12, the parameter d representing the distance between the transmission unit and the reception unit, the parameter AL representing an acceptable level of the transmission level, and a threshold α. Accordingly, the data input screens 14512 to 14514 that are used by input unit 1451 need only replace the input fields 145121, 145131, and 145141 for transmission level SL with an input field for threshold α.

[Fourth Embodiment]

A fourth exemplary embodiment of the present invention will now be described.

In the present exemplary embodiment, a configuration for horizontally omnidirectional transmission is described. While the second exemplary embodiment uses Equation 1 in FIG. 4 as the relational equation 1442, the present exemplary embodiment employs Equation 17 shown in FIG. 18 as the relational equation 1442.

Equation 17 has seven parameters: SL, Sv, d, f, g, h, and AL. The individual parameters represent as follows. SL is a transmission level of the transmission unit 11, $S_v=10 \log s_v$ is a backscattering intensity, d is a distance between the transmission unit 11 and the reception unit 12, f, g, and h are shapes of beams for the transmission unit 11 and the reception unit 12, and AL is an acceptable level of scattering level. In other words, Equation 17 represents that a value of $SL+Sv+10 \log(\pi^{3/2} fgh/d)$ needs to be equal to or less than AL so as to cause the level of a scattered wave reaching the reception unit 12 to be equal to or less than the acceptable level AL. Thus, supposing that values of some parameters are known, then the remaining unknown parameter value can be determined based on the known values and Equation 17. For example, if SL, Sv, f, g, h, and AL are given, an optimal value d is determined.

Figure 19:
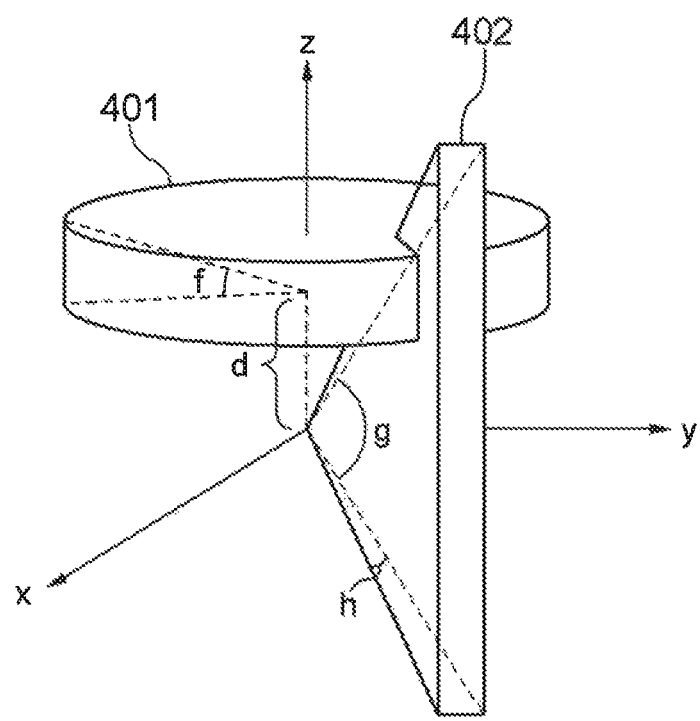
FIG. 19 is a schematic diagram illustrating specifications of the transmission unit and reception unit conceived for deriving the relational equation used for the fourth exemplary embodiment of the present invention.

FIG. 19 is a schematic diagram illustrating specifications of the transmission unit 11 and reception unit 12 conceived for deriving Equation 17. The following describes processes of deriving Equation 17 referring to FIG. 19.

[Process of Deriving Equation 17]

As illustrated in FIG. 19, the transmission unit 11 is disposed at a position away from the origin of XYZ coordinates by the distance d in the Z-axis direction, while the reception unit 12 is disposed at the origin. The transmission beam 401 is horizontally omnidirectional and beamwidth thereof is f. The reception beam 402 is formed in the shape as illustrated in FIG. 19, and has the horizontal beamwidth h and the vertical beamwidth g. The following discussion is based on cylindrical coordinates.

Transmission is horizontally omnidirectional and defined by Equation 18 in FIG. 20. Reception is defined by Equation 19 in FIG. 20.

A sound intensity on an axis per unit distance is denoted as $I_0$. Since the distance from the transmission point of a coordinates (r, θ, z) is $\{r^2+(z-d)^2\}^{1/2}$, the intensity of a sound incoming to a micro volume rdrdθdz at the coordinates (r, 0, z) is expressed as $\{I_0B_3(r, \theta, z)/\{r^2+(z-d)^2\}$. Let $S_v=10 \log s_v$ be a backscattering intensity, then the scattering intensity caused by the micro volume rdrdθdz at the reception point is defined by Equation 20 in FIG. 20. Since this is received with the beam $B_4$ (r, θ, z), an output voltage of the reception unit 12 is expressed by Equation 21 in FIG. 20. The response is assumed to be 1 here. Thus, reverberation R in the whole region is obtained by integrating Equation 21, as represented by Equation 22 in FIG. 20.

The above integration cannot be performed analytically, and thus an approximation is made instead. The present exemplary embodiment is based on the idea that reverberation is only dependent on being relative to the z axis, that is, reverberation is only dependent on r. Then, the above integration is defined by Equation 23 in FIG. 21.

The integration defined by Equation 23 is performed as described below. First, integration is performed with respect to z. The general Gaussian integral is applicable here, as expressed by Equation 24 in FIG. 21. Next, integration is performed with respect to θ. Setting coordinates in such a way that the beam center is at the center of an integral range, and regarding a point distant from the center of the integral range, i.e., θ=0, 2π, to be zero beam, the integral of 0≤θ<2π can be replaced with the integral of −∞<θ<∞. Then, the integration with respect to θ is defined by Equation 25 in FIG. 21.

Accordingly, the integration of R' is defined by Equation 26 in FIG. 21. In addition, R" in Equation 26 is defined by Equation 27 in FIG. 22. The integration with respect to R is defined by Equation 28 in FIG. 22 because the variable transformation $(1/r)=t$ leads to $(-1/r^2)dr=dt$. Therefore, R" is defined by Equation 29 in FIG. 22. The reverberation level RL" on a logarithmic scale is defined by Equation 30 in FIG. 22. Equation 17 appearing above represents the condition that the reverberation level RL" is equal to or less than an acceptable level AL. The above are processes of deriving Equation 17.

According to Equation 17, when SL, $S_v$, f, g, h, AL, and α, for example, are given, an optimum distance between the transmission unit 11 and reception unit 12 is determined. Likewise, when SL, $S_v$, d, g, h, AL, and α, for example, are given, an optimum z-axis beamwidth (a type of optimum beam shape) for the transmission unit 11 is determined. As with the second exemplary embodiment, known parameter values in Equation 17 may be entered by the operator through a graphical user interface.

[Fifth Embodiment]

A fifth exemplary embodiment of the present invention will now be described.

While the fourth exemplary embodiment uses Equation 17 in FIG. 18 as the relational equation 1442, the present exemplary embodiment employs Equation 31 shown in FIG. 23 as the relational equation 1442. The following describes processes of deriving Equation 31.

[Process of Deriving Equation 31]

As an indicator indicating the ease of detecting the target, the ratio of the level of reflection from the target to the level of reverberation is considered. The level of reverberation is represented by R", which is given in Equation 29 appearing in the processes of deriving Equation 17. Thus, letting E be the level of reflection from the target, the indicator described above is expressed as E/R". The level E of the reflection from the target is proportional to $I_0$ (sound intensity on an axis per unit distance). Thus, E/R" is not dependent on $I_0$ as seen in Equation 32 in FIG. 23. That is, E/R" is not dependent on SL. Given that E/R" is equal to or greater than a predetermined threshold α as a condition for reducing the effects of reverberation, Equation 31 in FIG. 23 is satisfied.

[Other Embodiments]

The present invention has been described above with some exemplary embodiments, but the present invention is not limited to these exemplary embodiments and allows various other additions or modifications. For example, the present invention includes other exemplary embodiments as described below.

Figure 24:
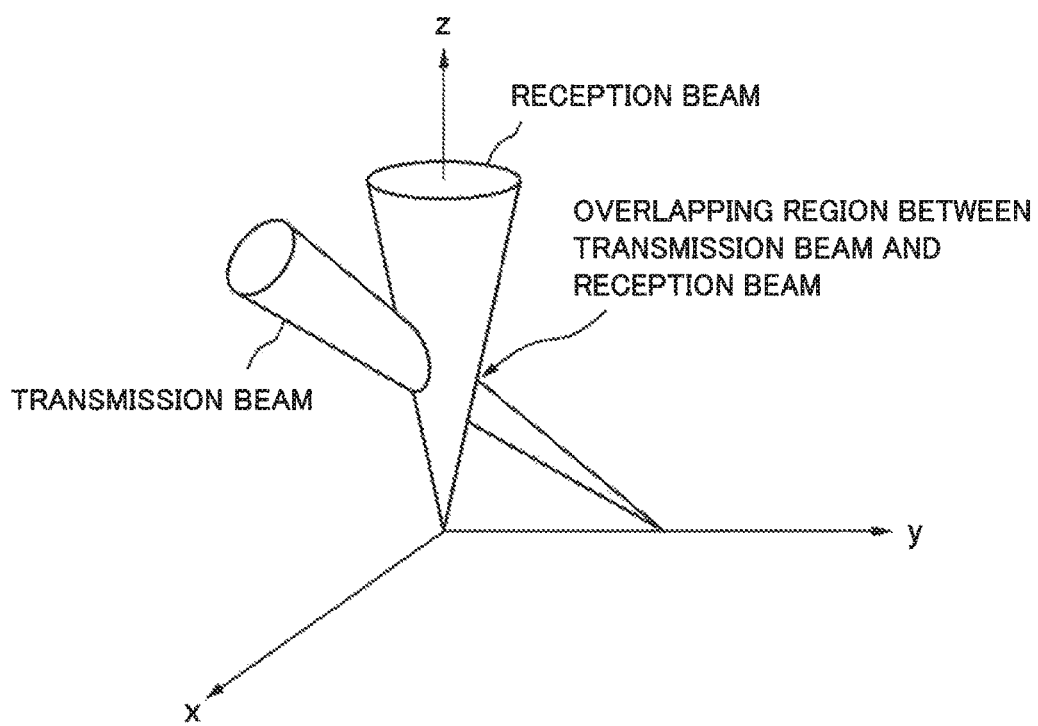
FIG. 24 is an explanatory diagram illustrating another exemplary embodiment of the present invention.

For example, as illustrated in FIG. 24, the beam for the transmission unit 11 (transmission beam) and the beam for the reception unit 12 (reception beam) differ in orientations so as to minimize a value obtained by integrating the scatter intensity in the region where both beams are overlapped. When the orientations of both beams are determined, the determined beam orientations are the optimum beam orientations. Thus, a relational equation may be developed, in view of beam orientations, for the purpose of reducing the effects of a scattered wave reaching the reception unit due to scattering caused by the medium through which a wave propagates, and orientations of the beams for the transmission unit and reception unit may be controlled so as to satisfy the relational equation. Note that, however, attention needs to be paid to the position of the target, which needs to be present in an overlapping region between the transmission beam and the reception beam.

According to the above-described exemplary embodiments, the operator enters known parameter values among a plurality of parameters included in the relational equation 1442. However, known parameter values may in whole or in part (e.g., backscattering intensity, and the like) be stored in the storing unit 144 as fixed values.

In addition, the above-described exemplary embodiments assume that the present invention is applied to active sonar. However, the present invention is not limited to active sonar, but may be applied to a wide variety of devices, including radar or lidar devices, that detect targets by transmitting waves such as sound waves, radio waves, or light waves and receiving reflected waves from the target.

The present invention has been described with reference to exemplary embodiments (and examples), but the present invention is not limited to these embodiments (and examples). Various modifications that could be understood by those skilled in the art may be made to configurations or details of the present invention within the scope of the present invention.

The present application claims priority based on Japanese Patent Application No. 2014-118541 filed on Jun. 9, 2014, and the entire disclosure of which is incorporated herein.

REFERENCE SIGNS LIST

10 Target detection device
11 Transmission unit
12 Reception unit
13 Detection unit
14 Control unit
15 Detection target object

What is claimed is:

1. A target detection device comprising:
a transmission unit that transmits a wave;
a reception unit that receives a reflected wave of the wave, the reflected wave being reflected from a detection target object;
a detection unit that detects the detection target object based on an output of the reception unit; and
a control unit configured to:
select, as an optimization target, a parameter representing a distance between the reception unit and the transmission unit,
obtain a transmission level of the transmission unit and a backscattering intensity of a medium through which the wave propagates from input data,
calculate a level of a scattered wave by the medium reaching the reception unit based on the transmission level, the backscattering intensity, beam shapes of the transmission unit and the reception unit and the distance between the reception unit and the transmission unit, and
determine the distance between the reception unit and the transmission unit at which the level of the scattered wave calculated is equal to or less than a threshold.

2. The target detection device according to claim 1, further comprising:
a movable body that moves at least one of the transmission unit and the reception unit,
wherein the control unit causes the movable body to move based on the distance determined.

3. The target detection device according to claim 1, comprising:
a transmission beam forming unit that forms a transmission beam shape of the transmission unit; and
a reception beam forming unit that forms a reception beam shape of the reception unit,
wherein the control unit controls the transmission beam forming unit and the reception beam forming unit based on the distance determined.

4. The target detection device according to claim 1,
wherein the level of the scattered wave is calculated using a relational equation in which the level of the scattered wave is defined by a parameter representing a transmission level of the transmission unit, a parameter representing a backscattering intensity of the medium, parameters representing beam shapes of the transmission unit and the reception unit, and the parameter representing the distance between the reception unit and the transmission unit.

5. The target detection device according to claim 1,
wherein the controller is further configured to determine the distance between the reception unit and the transmission unit at which a ratio of a level of the reflected wave from the detection target object to the level of the scattered wave reaching the reception unit is equal to or greater than a threshold.

6. A target detection method for use in a target detection device that includes a transmission unit that transmits a wave and a reception unit that receives a reflected wave of the wave, the reflected wave being reflected from a detection target object, the target detection method comprising:
selecting, as an optimization target, a parameter representing a distance between the reception unit and the transmission unit,
obtaining a transmission level of the transmission unit and a backscattering intensity of a medium through which the wave propagates from input data,
calculating a level of a scattered wave by the medium reaching the reception unit based on the transmission level, the backscattering intensity, beam shapes of the transmission unit and the reception unit and the distance between the reception unit and the transmission unit, and
determining the distance between the reception unit and the transmission unit at which the level of the scattered wave calculated is equal to or less than a threshold.

7. The target detection method according to claim 6,
wherein the target detection device includes a movable body that moves at least one of the transmission unit and the reception unit, and wherein the controlling comprises causing the movable body to move based on the distance determined.

8. The target detection method according to claim 6,
wherein the target detection device includes a transmission beam forming unit that forms a transmission beam shape of the transmission unit and a reception beam forming unit that forms a reception beam shape of the reception unit, and
wherein the controlling comprises controlling the transmission beam forming unit and the reception beam forming unit based on the distance determined.

9. A non-transitory recording medium storing a program causing a computer connected to a target detection device including a transmission unit that transmits a wave and a reception unit that receives a reflected wave of the wave, the reflected wave being reflected from a detection target object, to function as:
a control unit configured to:
select, as an optimization target, a parameter representing a distance between the reception unit and the transmission unit,
obtain a transmission level of the transmission unit and a backscattering intensity of a medium through which the wave propagates from input data,
calculate a level of a scattered wave by the medium reaching the reception unit based on the transmission level, the backscattering intensity, beam shapes of the transmission unit and the reception unit and the distance between the reception unit and the transmission unit, and
determine the distance between the reception unit and the transmission unit at which the level of the scattered wave calculated is equal to or less than a threshold.

10. The non-transitory recording medium according to claim 9,
wherein the target detection device includes a movable body that moves at least one of the transmission unit and the reception unit, and
wherein the control unit is further configured to cause the movable body to move based on the distance determined.

11. The non-transitory recording medium according to claim 9,
wherein the target detection device includes a transmission beam forming unit that forms a transmission beam shape of the transmission unit and a reception beam forming unit that forms a reception beam shape of the reception unit, and
wherein the control unit is further configured to control the transmission beam forming unit and the reception beam forming unit based on the distance determined.

* * * * *